United States Patent

Zalar

[15] 3,644,243

[45] Feb. 22, 1972

[54] THIASPIROACETAL POLYMERS

[72] Inventor: Frank V. Zalar, South Euclid, Ohio

[73] Assignee: The Lubrizol Corporation, Wickliffe, Ohio

[22] Filed: July 3, 1968

[21] Appl. No.: 742,179

[52] U.S. Cl..........................260/18 R, 260/37 R, 260/67 S, 260/79 R, 260/79.1 R, 260/609 F, 264/300
[51] Int. Cl..........................................................C08g 23/00
[58] Field of Search..................260/67 S, 609 F, 79, 79.1, 260/18

*Primary Examiner*—Hosea E. Taylor
*Assistant Examiner*—M. I. Marquis
*Attorney*—Roger Y. K. Hsu and William H. Pittman

[57] ABSTRACT

Polymers with high tensile and flexural strength, suitable for molding or milling, are obtained by the reaction of pentaerythritol with a thiadialdehyde or derivative thereof, or by the reaction of a reactive metal sulfide with a 3,9-bis(halomethyl)-spirobi(meta-dioxane) or a similar spiro intermediate. "Copolymers" may be prepared by substituting a salt of a dithiol for the sulfide.

10 Claims, No Drawings

THIASPIROACETAL POLYMERS

This invention relates to new polymeric compositions of matter, and more particularly to polymers containing repeating units of the formula

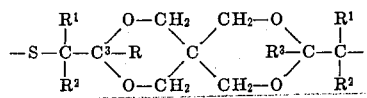

wherein each of $R^1$ and $R^2$ is individually hydrogen or a lower alkyl radical, and $R^3$ is hydrogen or methyl. As used herein, the term "lower alkyl radical" refers to alkyl radicals containing no more than five carbon atoms.

In a preferred embodiment of the invention, $R^1$, $R^2$ and $R^3$ are hydrogen; thus, the preferred polymers contain repeating units of the formula

The invention includes both "homopolymers" and "interpolymers," as defined hereinafter. For the sake of brevity, the polymers of this invention will sometimes be referred to hereinafter as "thiaspiroacetal polymers."

"Homopolymers" of this invention may be prepared by reacting pentaerythritol with a compound of the formula

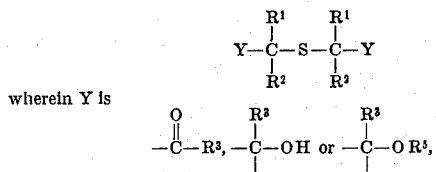

wherein Y is $$-\overset{O}{\underset{}{C}}-R^3, \quad -\overset{R^3}{\underset{OR^5}{C}}-OH \text{ or } -\overset{R^3}{\underset{OR^6}{C}}-OR^5,$$

or with a thioxane of the formula

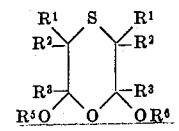

wherein $R^5$ and $R^6$ are lower alkyl radicals. The interrelation of these compounds may be illustrated with reference to the simplest member of the series, 3-thiaglutaraldehyde, and its tetraethyl acetal. The acetal is prepared by any one of several methods known in the art, including the reaction of chloroacetal with sodium sulfide and the reaction of sulfur dichloride with ethyl vinyl ether. Hydrolysis of 3-thiaglutaraldehyde tetraethyl acetal normally yields the thioxane, but the aldehyde itself and its hemiacetals may be obtained by variants of this and other known reactions.

The reaction of pentaerythritol with the thiadialdehyde (or derivative thereof) takes place upon heating the reactants to about 80°–200° C. in the presence of a small amount of an acid catalyst such as sulfuric acid or p-toluenesulfonic acid. It is preferred to carry out the reaction in a nonreactive polar solvent such as diethylene glycol dimethyl ether, dimethyl sulfoxide or sulfolane. When an acetal or thioxane is used as reactant, the course of the reaction is conveniently followed by measuring the alcohol evolved as a byproduct.

A second, and preferred, method for the preparation of thiaspiroacetal polymers is by the reaction of a reactive metal sulfide with a 3,9-bis(haloalkyl)-spirobi-(meta-dioxane) of the formula

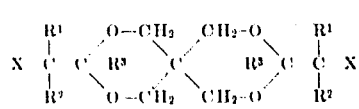

wherein X is a halogen, preferably chlorine. The reactive metal sulfides comprise chiefly the alkali metal sulfides, especially sodium sulfide.

The 3,9-bis(haloalkyl)-spirobi(meta-dioxane) employed in this reaction is easily prepared by the reaction of pentaerythritol with an α-halo aldehyde, methyl ketone or acetal or ketal thereof. Thus, 3,9-bis(chloromethyl)-2,4,8,10-tetroxaspiro[5.5] undecane, also known as 3,9-bis(chloromethyl)-spirobi(meta-dioxane), is prepared by the reaction of two moles of chloroacetal with one mole of pentaerythritol in the presence of a catalytic amount of p-toluenesulfonic acid. This reaction is known in the art, but the produce has been reported to be very resistant to nucleophilic substitution. Therefore, it is surprising that the reaction with sodium sulfide is easily accomplished.

The reaction takes place when the compounds are heated at about 70°–150° C. in a polar solvent such as dimethylformamide, dimethyl sulfoxide or sulfolane, or in aqueous emulsion. If an organic solvent is used, the metal halide precipitates as the reaction proceeds; when precipitation ceases, the reaction is complete. If oxygen is allowed to contact the mixture, the molecular weight of the thiaspiroacetal polymer is low; therefore, the reaction is preferably carried out in an inert atmosphere such as nitrogen or argon.

Another factor affecting the molecular weight of the polymer is the ratio of sodium sulfide to 3,9-bis(haloalkyl)-spirobi(meta-dioxane) in the reaction mixture. Maximum molecular weights are attained when equimolar amounts of the reagents are used or when sodium sulfide is present in up to about 3 percent excess. However, useful polymers are formed at a wide range of reactant ratios, and so these ratios are not to be considered critical.

If the thiaspiroacetal polymer is soluble in the reaction solvent, it may be recovered by evaporation of the solvent or by pouring the solution into an excess of water or some other liquid in which the polymer is insoluble. In many instances, the polymer precipitates from the reaction solvent upon cooling; it may then be recovered by filtration. Since the presence of solvent in the polymer adversely affects some of its properties, it is desirable to remove substantially all of the solvent by washing with water, alcohol, acetone, or a similar polar liquid which is a nonsolvent for the polymer; by evaporation, desirably at reduced pressure; or by a combination of these methods.

Polymers prepared according to the method described above usually have chains terminating in sulfur-containing end groups, ordinarily —SNa or the like. Such end groups sometimes affect the thermal stability of the molecule. If it is desired to increase thermal stability, the polymer may be stabilized by "capping" with a mercaptan-reactive compound such as an organic halide, epoxide or the like. Preferred capping agents include compounds of the formula RX, wherein R is an aliphatic radical (which may contain substituents such as hydroxy, carbonyl, ether, ester or nitro groups) and X is a halogen, preferably chlorine. The resulting capped polymers contain end groups with the formula RS—.

"Copolymers" according to the present invention are preferably prepared by the reaction of the 3,9-bis(haloalkyl)-spirobi-(meta-dioxane) with a reactive metal salt (usually the sodium salt) of a dithiol such as ethylene dithiol, propylene dithiol, 2,2-bis(4-mercaptophenyl)-propane (thiobisphenol A) or the like. They may also be prepared by reacting chloroacetal (or a homolog or analog thereof) with the metal salt of the dithiol and then reacting the intermediate thus obtained with pentaerythritol. Such copolymers have the formula

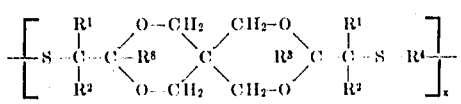

wherein $R^1$, $R^2$ and $R^3$ are as defined above and $R^4$ is a divalent radical derived from the dithiol.

The preparation of the polymers of this invention is illustrated by the following examples.

EXAMPLE 1

A mixture of 5 grams (0.019 mole) of 3-thiaglutar-aldehyde tetraethyl acetal, 2.6 grams (0.019 mole) of pentaerythritol, 0.1 gram of p-toluenesulfonic acid and 20 ml. of sulfolane is heated to 135°–140° C. under nitrogen, with stirring. Heating is continued for two hours as ethanol is removed by distillation; the reaction mixture becomes very viscous during this period. The product is poured into 300 ml. of acetone; the light brown thiaspiroacetal polymer is removed by filtration and dried in vacuum at 180°–190° C. Its intrinsic viscosity at 30° C. in dimethylformamide is 0.29.

EXAMPLE 2

A mixture of 3 grams (0.0156 mole) of 3,5-diethoxy-thioxane, 2.1 grams (0.0156 mole) of pentaerythritol, about 0.1 gram of p-toluenesulfonic acid and 20 ml. of sulfolane is heated under nitrogen, with stirring, at 125°–130° C. for 4 hours. The viscous yellow solution is cooled and poured into 600 ml. of acetone. An oily precipitate forms which slowly changes to a white solid. This solid is redissolved in sulfolane and again precipitated by pouring into acetone. The thiaspiroacetal polymer is separated by filtration and dried in vacuum.

EXAMPLE 3

3,9-Bis(chloromethyl)-spirobi(meta-dioxane) is prepared by the reaction of two moles of chloroacetaldehyde dimethyl acetal with 1 mole of pentaerythritol in benzene as a solvent, in the presence of a strongly acidic polystyrene sulfonic acid cation exchange resin. A mixture of 1,931 grams of 3,9-bis(chloromethyl)-spirobi(meta-dioxane) with 1,003 grams of 60.5 percent sodium sulfide and 6 liters of dimethyl sulfoxide is stirred and heated under nitrogen to 75°–80° C.; an exothermic reaction then occurs which causes the temperature to rise to 120°–125° C. The mixture is maintained at this temperature for 25 minutes, and then cooled to room temperature. A solid mass is obtained which is cut into pieces and washed with two 5-gallon portions of water. The white polymer thus obtained is washed with two gallons of ethanol and dried. The resulting thiaspiroacetal polymer has an intrinsic viscosity of 1.3 in chloroform. It contains 14.63 percent sulfur, as compared with a theoretical value of 14.76 percent.

EXAMPLE 4

The procedure of Example 3 is repeated, except that the chloroacetaldehyde dimethyl acetal is replaced by an equimolar amount of chloroacetone dimethyl ketal. A similar polymer is obtained.

EXAMPLE 5

A polymer is prepared by the method of Example 3 from 771.3 grams (3.0 moles) of 3,9-bis(chloromethyl)-spirobi-(meta-dioxane), 387 grams (3.0 moles) of 60.5 percent sodium sulfide, and 2.6 liters of dimethyl sulfoxide. After the initial exothermic reaction has taken place, the reaction mixture is maintained at 115° C. for one hour and then 20 ml. of ethylene chlorohydrin is added and the mixture is stirred at 115° C. for an additional 45 minutes. The mixture is cooled to room temperature and filtered, and the solid residue is washed with ethanol and with two 36-liter portions of water and dried in vacuum at 80° C. for 5 hours. The resulting thiaspiroacetal polymer has an inherent viscosity (0.5 gram in 100 ml. of chloroform at 30° C.) of 0.94.

EXAMPLE 6

A mixture of 1 mole of 3,9-bis(chloromethyl)-spirobi(meta-dioxane), 1 mole of the disodium salt of 4,4'-isopropylidenebisthiophenol and 1.5 liters of dimethyl sulfoxide is stirred and heated under nitrogen at 75°–80° C. When the reaction is complete, the mixture is cooled to room temperature and the solid polymer is removed, washed with ethanol and dried.

EXAMPLE 7

Following the procedure of Example 6, a polymer is prepared from 1 mole of 3,9-bis(chloromethyl)-3,9-methyl-spirobi-(meta-dioxane) and 1 mole of the sodium salt of 1,4-cyclohexane-dithiol.

The polymers of this invention are characterized by high flexural and tensile strength. They are particularly useful in applications involving molding (including compression and injection molding) and milling. Frequently, the polymer may be used "as is" for these purposes; that is, no additional constituents need be added to modify the polymer. However, it is sometimes desirable to introduce additional substances, particularly those which act as lubricants and mold release agents. Typical of such substances are oily materials such as lanolin, linseed oil, mineral oil, neatsfoot oil, paraffin, beeswax and castor oil; solid lubricants such as graphite; and metal salts (particularly aluminum, chromium, zinc, calcium, magnesium, barium or zirconium) of high molecular weight carboxylic acids such as oleic, stearic or palmitic acid. The preferred mold release agent is calcium stearate. In general, up to about 5 parts by weight of release agent, preferably about 0.5–2.0 parts, is used per 100 parts of polymer.

The utility of the polymers of this invention in compression molding is demonstrated by a test in which 70 grams of the polymer of Example 3 is powdered and molded in a 6 inch × 6 inch × 0.08 inch semipositive mold preheated to 350° F. Molding is carried out at a temperature of 350°–400° F. as the pressure is gradually increased from 700 p.s.i. to 2,780 p.s.i. The resulting high-clarity molded article has a tensile strength (as measured by ASTM method D638) of 10,850 p.s.i. at the yield point and 6,830 p.s.i. at the fail point (0.2 inches per minute) and an elongation of 1.5–3.5 percent at the yield point and 20 percent at the fail point. The flexural strength at 5 percent deflection, as measured by ASTM method D790, is 22,156 pounds.

What is claimed is:

1. A polymer consisting essentially of repeating units of the formula

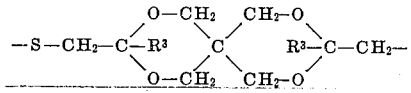

wherein $R^3$ is hydrogen or methyl.

2. A polymer according to claim 1 wherein $R^3$ is hydrogen.

3. A composition suitable for molding and milling which comprises a major proportion of a polymer according to claim 1 and a minor proportion up to about 5 parts, per 100 parts of said polymer, of a lubricant or mold release agent.

4. A composition according to claim 3 wherein the lubricant is calcium stearate.

5. A composition suitable for molding and milling which comprises a major proportion of a polymer according to claim 2 and a minor proportion up to about 5 parts, per 100 parts of said polymer, of a lubricant or mold release agent.

6. A composition according to claim 5 wherein the lubricant is calcium stearate.

7. A method for preparing a polymer consisting essentially of repeating units of the formula

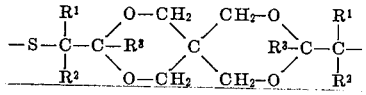

wherein each of $R^1$ and $R^2$ is hydrogen or a lower alkyl radical and $R^3$ is hydrogen or methyl, which comprises reacting, at a temperature of about 80°–200° C. and in the presence of an acid catalyst, pentaerythritol with a compound of the formula

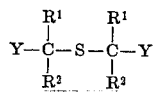

wherein Y is

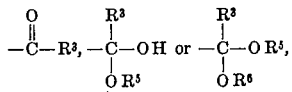

or with a thioxane of the formula

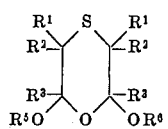

wherein $R^5$ and $R^6$ are lower alkyl radicals.

8. A method according to claim 7 wherein pentaerythritol is reacted with a compound of the formula

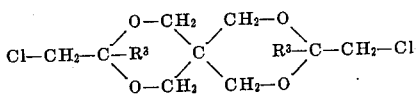

9. A method for preparing a polymer according to claim 1 which comprises reacting, at a temperature of about 70°–150° C., sodium monosulfide with a compound of the formula 10. A method according to claim 9 wherein $R^3$ is hydrogen.

* * * * *

UNITED STATES PATENT OFFICE
CERTIFICATE OF CORRECTION

Patent No. 3,644,243      Dated February 22, 1972

Inventor(s) Frank V. Zalar

It is certified that error appears in the above-identified patent and that said Letters Patent are hereby corrected as shown below:

On the cover sheet insert -- [56]

References Cited

UNITED STATES PATENTS

| | | | |
|---|---|---|---|
| 2,785,996 | 3/57 | Kress | 117-139.4 |
| 2,960,495 | 11/67 | Stansbury, Jr., et al | 260- 79.1 |
| 2,996,516 | 8/61 | Guest, et al. | 260-340.7 |
| 2,998,427 | 8/61 | Stansbury, Jr., et al. | 260-340.7 |
| 3,312,669 | 4/67 | Giordano | 260- 79.1 |
| 3,349,047 | 10/67 | Sheard | 260- 18 |

Witco Bulletin 55-4R-5-63      260- 18
(Pages 1, 2, 3, 14, 15 and 16)

Signed and sealed this 1st day of August 1972.

(SEAL)
Attest:

EDWARD M. FLETCHER, JR.
Attesting Officer

ROBERT GOTTSCHALK
Commissioner of Patents